United States Patent [19]

Patterson, Jr.

[11] Patent Number: 4,801,127
[45] Date of Patent: Jan. 31, 1989

[54] HANDLE OPERATED WIRE PULLER

[76] Inventor: Robert D. Patterson, Jr., 113 Ruby Ct., Maitland, Fla. 32751

[21] Appl. No.: 28,862

[22] Filed: Mar. 23, 1987

[51] Int. Cl.$^4$ .............................................. E21C 29/16
[52] U.S. Cl. ......................................... 254/134.3 FT
[58] Field of Search ................ 254/134.3 FT, 134.3 R

[56] References Cited

U.S. PATENT DOCUMENTS

| | | | |
|---|---|---|---|
| 2,599,929 | 6/1952 | Mallasch | 254/134.3 FT |
| 2,661,187 | 12/1953 | Dailey . | |
| 2,948,510 | 8/1960 | Kieser . | |
| 2,990,160 | 6/1961 | Foley . | |
| 3,201,090 | 8/1965 | Jones | 254/134.3 FT |
| 3,291,449 | 12/1966 | Hughes . | |
| 3,302,929 | 2/1967 | Danielson et al. . | |
| 3,968,952 | 7/1976 | Newell | 254/134.3 R |
| 4,337,924 | 7/1982 | Gebo . | |

FOREIGN PATENT DOCUMENTS

516850  9/1955  Canada ..................... 254/134.3 FT

Primary Examiner—Robert C. Watson
Attorney, Agent, or Firm—Julian C. Renfro

[57] ABSTRACT

A lightweight, portable device for pulling a plurality of relatively small wires through a conduit by the use of a rope attached thereto, without using a winch or necessitating the use of external power. This device comprises an elongate frame particularly adapted for use in a substantially upright position and having lower and upper ends, with a pivotally mounted operating lever operatively located adjacent a middle portion of the frame. At least one force-reacting component is utilized on the frame, over which the rope used with the device passes, for changing the direction of pull of the rope. Importantly, rope clamping means are utilized on the operaing lever for releasably grasping successive portions of the rope during the pulling process, and the operating lever is movable by one or more operators about its pivot point from a position in which it resides in a plane substantially parallel to and closely adjacent the plane of said elongate frame, to a position in which it resides at approximately right angles to the plane of the frame. Each such movement of the operating lever serves to cause several feet of rope to move with respect to the force-reacting component that serves to change the pull direction of the rope, and thus to cause the plurality of wires attached to the rope to move along the conduit for a like distance.

20 Claims, 7 Drawing Sheets

HANDLE OPERATED WIRE PULLER

BACKGROUND OF THE INVENTION

Persons skilled in the construction field will be familiar with the fact that sound safety practice requires that all current carrying cable and other types of wire be installed in appropriately sized conduit which, for example, may be arranged to interconnect service entrance box and distribution box centers.

Typical construction procedure requires that the service entrance and distribution box centers, the interconnecting conduit and like be placed in a new building at an early stage in the construction thereof. At this point in such construction the boxes and conduit are empty, inasmuch as the electrical and other types of conductors are to be installed at a later stage of the construction. In large commercial and industrial buildings, the conduit employed may be required to have a diameter of one-half inch to approximately four inches, and when installed will be bent at various angles, offset, elbowed or the like.

The conductors employed in conduit of the sizes here under consideration frequently have nominal diameters of half an inch or less. Material economy dictates that as many conductors as possible be placed in each conduit, which conduit may be of a diameter ranging from one-half inch to one and one-half inches. The length of conduit run obviously varies, with the lengths depending upon the physical features of the building, and runs of several hundred feet are not uncommon.

Long runs of wire are frequently utilized when, for example, wiring is to be installed for the tall lights used to illuminate large parking lots. These facts, namely, the length and often erratic path of the conduit run, and the size and number of conductors placed in each conduit, make the job of pulling the conductors through such conduit an extremely difficult one, unless some manually powered or electrically powered wire puller is utilized.

To better understand the instant invention, brief consideration should be given to the procedure followed in conductor installation. Initially, a very light lead line is fed through the conduit run. This may be accomplished by first shooting a small jet line with a string through the conduit. Compressed air is usually employed for this purpose. The lead line is then connected to a cable or pull rope (nylon or plastic) which is fed through the run. A mechanical connection is then provided between the cable or rope and the conductors. The cable or rope and the connected conductors are then pulled through the conduit. Recently, pipes of polyvinyl chloride (p.v.c.) or of aluminum have been employed for use as conduits, inasmuch as p.v.c. and aluminum have the advantage of light weight, resistance to deterioration during long periods underground, and in addition, these are relatively easy to install. With conduit of p.v.c. or aluminum, a rope pull line is far more desirable than a steel cable, for the steel cable tends to gouge the relatively soft interiors of these types of conduit.

Problems and difficulties have been encountered when employing such force multiplying devices on small pull ropes, which stem largely from the fact that the pulling force may exceed the tensile strength of the pull line, which will suddenly sever or break the pull line. Such an occurrence may well result in injury to nearby operators or damage to property.

To develop the pulling force required, prior art practice has dictated that a wide variety of force multiplying devices be used. For example, block and tackle, windlass and powered winches have in the past been employed. Because of the wide difference of the physical features of each installation, the equipment referred to above was usually specially rigged for each job. Set up time alone, therefore, represented an important cost factor for each job. Frequently, set up time could not even be estimated accurately before the job was actually begun. In many cases, special temporary scaffolding would have to be built before conductor pulling could commence.

Commercial machines utilized for pulling large diameter wire cost a minimum of $3,000 to $5,000.00 and weigh in the vicinity of three hundred pounds, which of course means that one person cannot alone operate a machine. Consequently, when #6 wire or similar size is being dealt with, there has been a tendency to move in the direction of using hand operated devices, which usually can be operated by one person. Most of such hand operated devices, however, have used a crank and pulley arrangement, in the nature of a winch. Unfortunately, such a device can only accommodate a finite length of cable, typically two hundred feet or less, so in the event that wiring is to be installed underground in a large parking lot, for example, where considerable distances between light poles are involved, such a prior art device cannot be used.

Therefore, it is to be seen that a long standing need has existed for light duty wire puller which provides pulling power with an extra measure of safety in pulling smaller size conductors.

SUMMARY OF THE INVENTION

I have found a need to exist in the industry for a lightweight, portable device for pulling a plurality of small wires through a very long conduit by the use of a rope, without necessitating the use of a winch, or requiring the application of external power. The use of a manually operated wire pulling device obviates the need for running a long extension cord, and makes unnecessary the use of a portable electric power supply, with all of its setup problems and its bulkiness.

In accordance with this invention I provide an elongate frame such as of aluminum for example, which is adapted for use in a substantially upright position. My novel elongate frame has floor engaging portions at its lower end, and adjacent its upper end, I provide a pivotally mounted operating lever having thereon a handle adapted to be grasped by a single operator, or else two or more operators. This operating lever is used in association with a rope, and serves to pull the rope in a series of approximately three foot increments through a conduit, along with a cluster of wires attached to the end of the rope.

Mounted on a central portion of the handle of the operating lever is a rope clamping means of such a nature that rope can pass easily in one direction therethrough, but with this device automatically functioning to prevent the rope from passing through in the opposite direction. Therefore, the rope clamping means makes it possible for each operating lever movement in an arcuate direction away from the plane of the frame to pull two or three feet of rope through the conduit. The rope is not moved in the opposite direction, however, each time the operating lever is returned to a position alongside the principal frame members, thus preventing the net gain being lost.

The operating lever is thus movable by one or more operators about its pivot point from a position in which the operating lever resides in a plane substantially parallel to and closely adjacent the plane of the elongate frame, forward to a position in which the operating lever resides at approximately right angles to the plane of said frame. The handle of the operating lever thus moves accurately about the pivot point of the operating lever, and each such movement of the operating lever in a generally downward direction serves to cause several feet of rope to move with respect to a force-reacting component on the frame that serves to change the pull direction of the rope, and thus to cause the plurality of wires attached to the rope to move along the conduit for a like distance.

Importantly, there is no practical limit to the number of feet of rope that can be used with my device, thus making it ideal for use when running electrical wires underground between large, widely spaced light poles or junction boxes, for example. This is in distinct contrast to the hand cranked wire pullers already in use with medium to small diameter electrical wire, for the pulley used on such a device can only accommodate up to approximately 200 feet of rope.

Effective clamping means are utilized for holding the movable portions of my device against the frame menbers during storage or transit, and my device is light enough and convenient enough in its operation as to enable effective use by a single, unassisted operator.

Thus, it is to be seen that a principal object of my invention to provide a lightweight, easily portable device enabling wires to be pulled through a conduit, either underground or overhead, without necessitating the use of external power, or utilizing a winch type device.

It is another object of my invention to provide a manually operable wire pulling device usable in at least two different modes—a freestanding mode and a mode in which the device is caused to lean up against a firm vertical support surface.

It is still another object of my invention to provide a wire pulling device made up of an elongate frame, upon which a sufficient number of force-reacting components are mounted, as will enable the operator to bring about a downward pull, an upward pull, or a pull at a selected angle therebetween.

It is yet still another object of my invention to provide a portable wire pulling device utilizing pulleys of the snatch block type on the force reacting components, that readily open to permit rapid threading of the rope therethrough;

It is yet another object of my invention to provide a wire pulling device that can be changed from its transport configuration to an operative configuration of a desired type in a minimum length of time, and after use then quickly restored to its transport configuration.

It is yet another object of my invention to provide a wire pulling device of such light weight as to enable one operator to transport it from place to place and perform all loading, unloading and wire pulling operations without the aid of any other operator.

These and other objects, features and advantages may be more apparent as the description proceeds.

DETAILED DESCRIPTION

In accordance with this invention I provide an elongate frame 10 such as of aluminum for example, which is adapted for use in a substantially upright position. As revealed in FIG. 1, my novel elongate frame 10 principally comprises a pair of elongate structural members 12 affixed together in a spaced, parallel relation, involving a cross member 14 adjacent its lower, floor engaging end 15, and a cross member 18 at its upper end 16. Inasmuch as the elongate structural members may form any of several different angles with the floor or the ground, the lowermost member on the structural members 12 preferably takes the form of a piece of tubing 19, which has a desirable type of ground contact. The member 19 may be called a bottom brace or floor brace. As is obvious, the cross members 14 and 18 serve to rigidly hold the principal elongate members 12 in the desired spaced parallel relationship.

For the members 12 I prefer to use aluminum tubing having a square cross section, such as one and one-half inches on a side, but obviously I am not to be limited to this, for round tubing, or metal structural members of still another cross section could be used if desired. Aluminum is preferred over steel because of its lightness, for it is highly desirable for one man to be able to transport and use my device unassisted.

Pivotally mounted at approximately the midpoint of the elongate structural members 12 of my portable device is an operating lever 20 having thereon a handle 22 adapted to be grasped by a single operator, or else by two or more operators. The operating lever has a pair of arms 23, with the end of each arm remote from the handle 22 being pivotally mounted at a respective pivot support location 24 on the front side of the elongate frame, or more particularly, to the front sides of the principal structural members 12. The pivot locations 24 are supported on the respective members 12 in careful alignment with each other.

Figure 3:
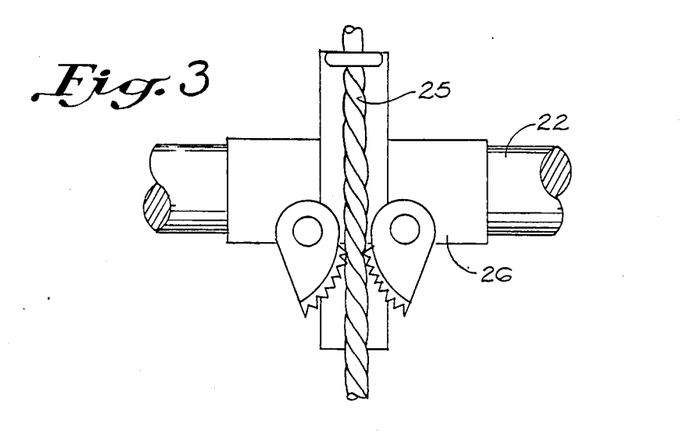
FIG. 3 is a view to a substantially larger scale of a rope clamping means of the type used on the handle of the operating lever, so that the rope can pass only in one direction therethrough.

Mounted on a central, upper portion of the handle 22 is a rope clamping means 26 of such a nature that a rope 25 can pass easily in one direction therethrough, but this device automatically functions to prevent the rope passing through in the opposite direction. This type of device, shown to a larger scale in FIG. 3, is able to automatically and releasably grasp a rope when it moves in a given direction, and it is known in boating circles as a "cam cleat".

A brace frame or auxiliary frame 28 made up of a pair of one-piece elongate members 30 is pivotally affixed at locations 32 on the backside of the elongate frame made up of the principal frame members 12. This auxiliary or brace frame, when moved to the wide stance shown in FIG. 1, serves to hold the frame 10 in an operative upright position when my device is being used in its freestanding mode. A locking type brace 31 of a type conventionally used on stepladders is utilized to hold the frame members in the desired wide stance position, to prevent an undesired closing up or collapse of the frame. When, however, my device is to be used in a manner in which it leans against a wall or other firm vertical surface, the auxiliary frame 28 is not used, but rather is maintained in its folded position, in which its plane is parallel to the plane of principal elongate frame 10 made up of the structural members 12. More details of the mode involving my device leaning against a wall will be set forth hereinafter.

I prefer to utilize a section of round tubing 33 on the bottom ends of the elongate members 30, which provides a desirable type of ground contact.

My device can be used very effectively when it is desired to pull wires through an overhead conduit, and to that end, I provide a lower force reacting component close to the lower end 15 of the elongate frame 10. The lower force reacting component preferably takes the form of a pulley 36 affixed to the approximate centerpoint of the lower structural member 14.

As to the upper end 16 of my device, mounted on upper cross member 18 of the frame is the upper force-reacting component, which preferably takes the form of a pulley 39, mounted approximately in the center of the upper structural member 18.

As will be understood from a study of FIG. 1, after passing through the rope gripping device 26 on the handle, the rope 25 passes through the pulley 39 forming a vital part of the upper force reacting component, before extending downwardly into the conduit located below the operator, through which the wires are being pulled.

It is to be understood that if a downward pull is to be made with respect to wires to be pulled through an overhead conduit, the rope 25 passes through the upper pulley 39 as well as the lower pulley 36, after which the rope travels upwardly into such overhead conduit.

Figures 4, 5:
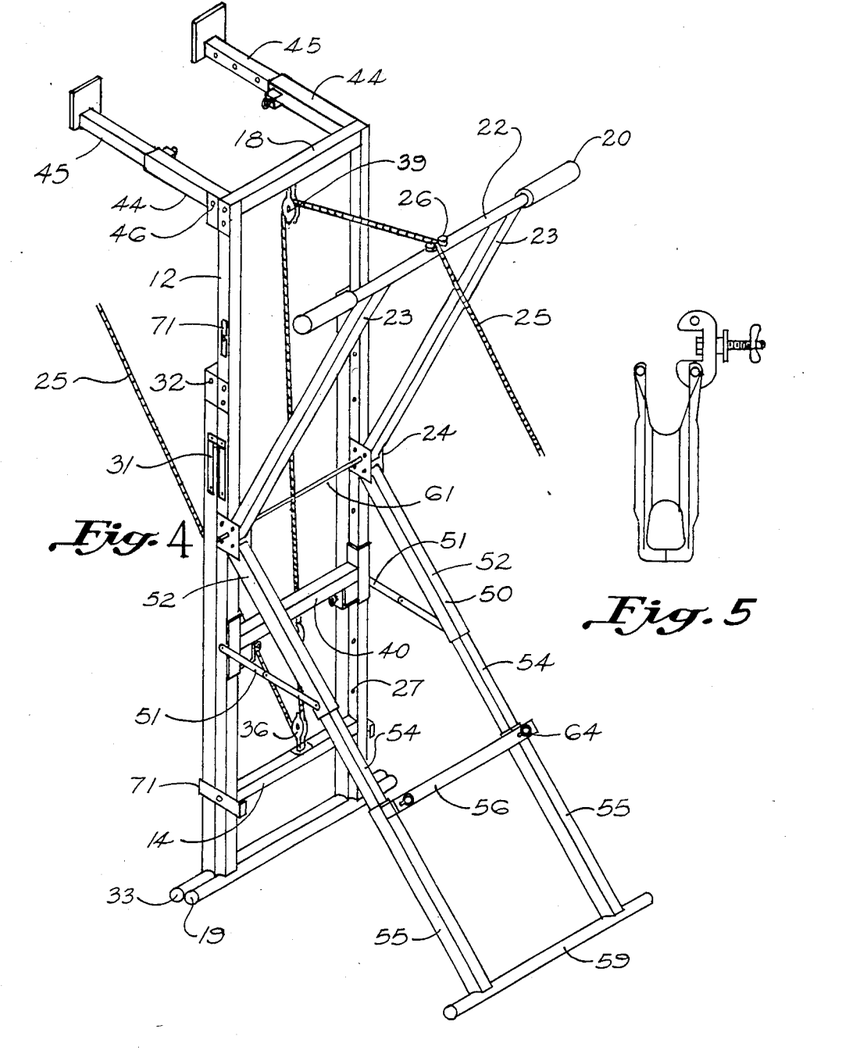
FIG. 4 is a view of my device in the mode in which it is not freestanding, but in this instance leaning against a wall for support, and with the rope in a position for accomplishing a downward pull.
FIG. 5 is a showing of a typical pulley of a type that can be readily opened by the operator removing a pin, with the use of this "snatch block" type of pulley greatly simplifying the threading of the rope through the several pulleys of my device.

The type of pulley I prefer to utilize at each location of my novel wire pulling device is shown in FIG. 5, and it will there be noted that this typical pulley can be "broken" by the operator removing a certain pin on the pulley. This opening up of the pulley greatly simplifies the threading of the rope therethrough. This type of pulley is sometimes known as a "snatch block," and by appropriate pin removal, a portion of each pulley can be made available for the rapid threading of rope therethrough. After the threading is complete, each pulley is of course reclosed, and the pin holding the pulley portions together is reinserted.

It is because of this pulley construction that I am able to affix one end of the rope 25 to the bundle of wires to be pulled through the conduit, then thread the rope through the unidirectional device 26, and only then proceed to pass the mid-portions of the rope through the selected pulleys. As should be obvious, if ordinary pulleys were used on my device, it would be necessary to work with a free end of the rope, so that such free end can be successively passed through each pulley. This, quite obviously, is a time consuming procedure that can well be avoided.

Although I am not limited to the use of a pulley by any certain manufacturer, I have found that pulleys made by Western Power Products, Inc. of Portland, Oreg. on to be highly satisfactory, and on my wire pulling device I prefer the use of Model 303 pulleys by the aforementioned company.

Returning to structural considerations, and as will become more obvious hereinafter, there are other ways in which my novel wire puller can be utilized, and to that end I also utilize a third, adjustable height force reacting component 40 that may be positioned at any of several desirable positions along the principal frame members 12, so that a pull in a particular direction can be readily brought about. I prefer to use a pulley 42 on the force reacting component 40, which I may also call the middle force reacting component. The means for the mounting of the middle force reacting component 40 with respect to a selected, aligned pair of holes 27 in the members 12 will shortly be set forth.

Before describing the different operational modes of my device, it should be pointed out that the operating lever 20 normally resides in the plane of the principal frame members 12, and when in that position, the rope 25 is caused to be grasped by the rope gripping portion 26 centrally located on the handle 22. If the operator or operators at this point cause the operating lever 20 to be rotated downwardly, while pivoting around the aligned pivot points 24, this will cause several feet of the rope to be pulled through the conduit, thus causing the cluster of small wires to be pulled for an equal extent along the interior of the conduit, which is not shown in this figure.

It is now desired for the unidirectionally functioning rope gripping portion 26 to grasp the rope 25 at a new location, so that an additional increment of rope, and therefore the wire cluster, can be pulled through the conduit. To that end, the rope adjacent the gripping device 26 is held by an operator, and the operating lever 20 then being caused to move upward, with the rope sliding through the cam cleat 26, until the operating lever reaches a position in which it essentially resides in the plane of the principal frame members 12. Because of the construction of the device 26, the rope 25 is allowed to pass through this device in the rearwardly moving direction without inhibition, but at such time as the handle 22 is again ready to be pulled down from the plane of the principal frame members, forwardly into the extended position shown in FIG. 1, the rope grasping device or cam cleat 26 has releasably locked itself to the rope.

Therefore, it is to be seen that the downward arcuate motion of the handle 22 of the operating lever 20 about the lever pivot points 24 causes the rope 25 and the cluster of wires to be pulled for several additional feet through the conduit. As should now be clear, the rope 25 in FIG. 1 does not move in the retreating direction with respect to the pulley 39 when the handle 22 is moved back toward the plane of the members 12, for the cam cleat 26, quite desirably, does not lock onto the rope 25 when the handle is being moved upwardly.

It should now be apparent that the operator or operators, by appropriate handle manipulation, move the operating lever 20 from the planar position to the extended position for a number of times during the operation in which the interaction of the rope 25 with the cam cleat 26 serves to pull the cluster of wires through the conduit, with successive portions of rope being pulled through the conduit each time the handle is moved forwardly from the planar position to the extended position.

It is to be noted that the operating lever 20 is moved approximately 120° about the aligned pivot points 24 in the typical instance, but as should be obvious, depending on the preference of the operator or operators, the handle 22 may be pulled in a number of rapid strokes of comparatively small extent, or, alternatively, it may be pulled less frequently, but with the operating lever 20 moving a greater number of degrees about the pivot points 24 during each downward motion of the handle.

Figure 1:
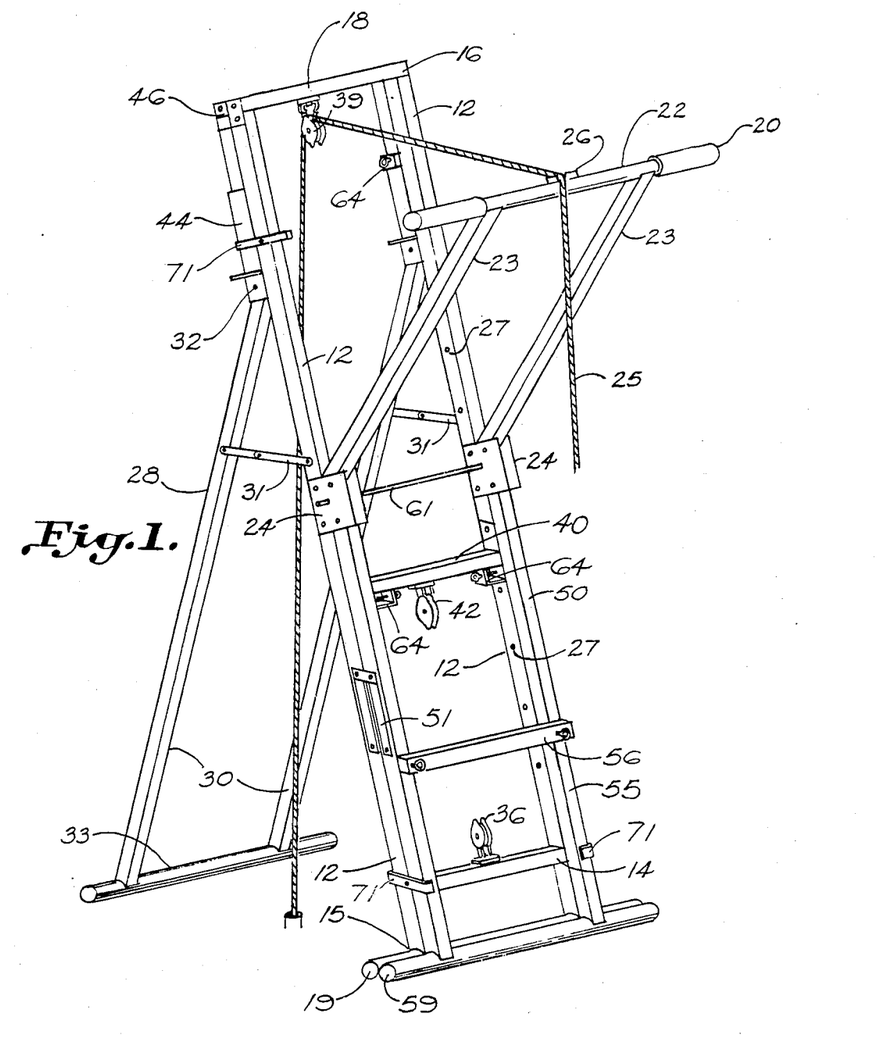
FIG. 1 is a perspective view of a handle operated wire puller in accordance with my invention, with the device in this instance being shown in the freestanding position, and with the rope being shown in a typical position.
Figure 2:
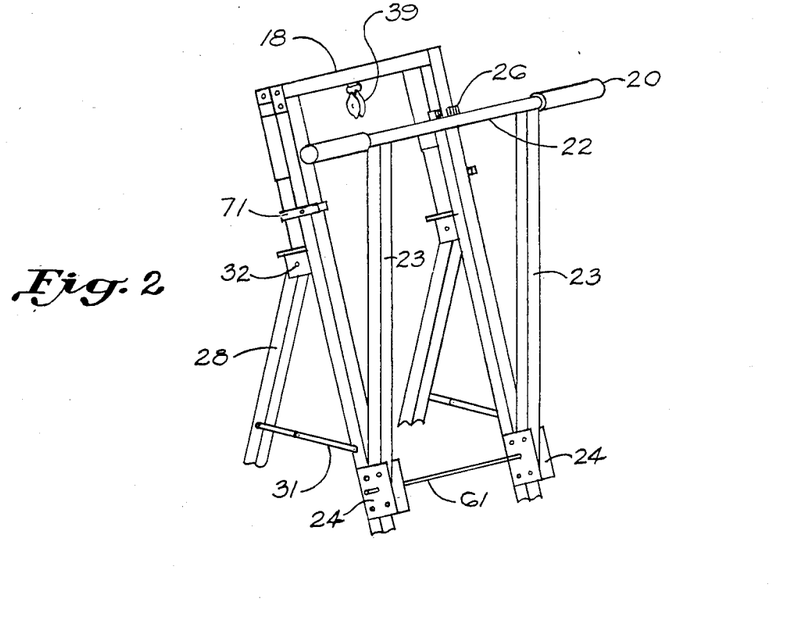
FIG. 2 is a fragmentary view of the upper portion of my wire puller, with certain details of the pivotally mounted operating lever being shown in this instance.

Quite advantageously, my hand operated wire puller may be utilized in a wide legged stance, such as shown in FIG. 1, with the auxiliary or support frame 28 being hingedly connected on the backside of said principal frame members 12. As is obvious, the members 30 of the support frame 28 can reside close to the principal frame members 12 at such time as my device is being transported, but with the support members being in the extended position when the device is being utilized in a freestanding position, such as when it is being utilized in a parking lot for example, where there is no wall to lean the device against. The upper locking brace 31 on each side of the device serve to hold the elongate members 30 in the extended positions.

A different mode is employed when my hand operated wire puller is being utilized adjacent a wall, for in that instance, and as illustrated in FIG. 4, I utilize a pair of short upper legs 44 of adjustable length that are pivotally mounted at locations 46 on the uppermost rear part of the principal elongate members 12. When the legs 44 are moved to the extended position during usage of my device in this second mode, they form approximately a right angle with the principal frame members 12. The outer portions 45 of the short adjustable length legs 44 are caused to rest against the wall or other firm vertical surface, with the lower end 14 of the principal frame being spaced a greater distance from the wall than a distance corresponding to the effective length of the legs 44, thus to provide additional stability to the device.

Figure 6:
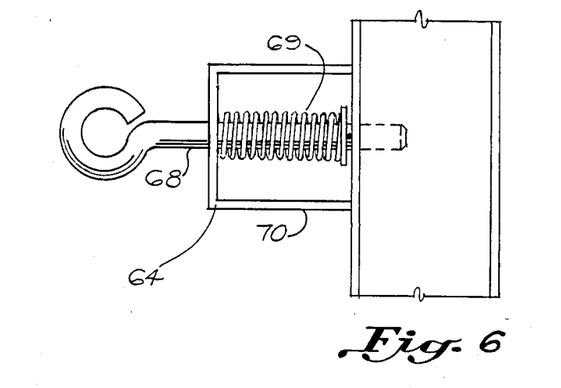
FIG. 6 is an enlarged view of the desired form of locking pin used on the frame members, by the use of which auxiliary support components, movable force-reacting devices, and the like may be selectively clamped to the elongate structural members.

Preferably the portions 44 of the short legs constituting the wall brace are of square aluminum tubing 1½ inches on a side, whereas the outer portions 45 may be of square aluminum tubing 1¼ inches on a side. By virtue of this construction, the leg portions 45 are in a telescopic relation with the principal leg portions 44. As best seen in FIG. 4, locking members 64 of the type illustrated to large scale in FIG. 6 are used to secure the leg portions 45 in the desired position with respect to the principal portions 44 of the short legs, and in addition, locking members 64 of the type illustrated in FIG. 6 are used on occasion to releasably hold the legs 44 in the outwardly extended position, as shown in FIG. 4.

To diminish the chance of the elongate frame of my device being caused to fall away from the wall during its use, I prefer to utilize an adjustable auxiliary support component 50 on the front of my device, as is best seen in FIG. 4. The component 50 is principally constituted by a pair of elongate members 52, that are pivotally connected at a mid portion on the front side of the principal frame members 12. Note in FIG. 4 that the pair of members 24 may be sufficiently large as to form a pivot bases for the upper ends of the respective members 52. The auxiliary support component 50 is intended to be used only at such time as the legs 44 of the wall brace on the upper end of the elongate frame have been extended, and the principal frame members are leaning against the wall (via legs 44), instead of the elongate frame being utilized in its freestanding mode.

A lower locking brace 51, similar to upper locking brace 31, is preferably utilized to hold the upper leg portions 52 in the extended position, and the leg members preferably have extensible lower portions so that front support members of a desirable length can be obtained. I prefer for each of the members 52 to be of square aluminum tubing 1½ inches on a side, into each of which is welded a length of square tubing 54, with the portions 54 being for example 1¼ inches on a side. Heliarc welding techniques are preferred for use in this instance, to affix the leg portions 54 inside the members 52.

As best seen in FIG. 4, the leg portions 54 are in a slidable relation with respect to lower leg members 55, latter members being of square tubing 1½ inches on a side. It is to be noted that a fixed brace 56 is preferably used between the members 55 in the interests of stability. The distance between the upper leg members 52 and the lower leg members 55 can be altered at will by the operator, this adjustability being made possible by the provision of a locking member 64 of the type illustrated in FIG. 6 on each end of the member 56, and the provision of a suitable array of evenly spaced holes in each leg portion 54. As can be seen in FIG. 6, the outer ends of the pair of spring biased pins 68 of the devices 64 can extend into a selected pair of holes in the two parallel members 54. In this way, the degree the extensible leg portions 54 extend out of the lower leg portions 55 can be carefully established, such that the overall length of the front support 50 will be maintained at an appropriate value.

Generally in the same manner as when my device was used in its freestanding mode, by appropriate manipulation of the operating lever 20 when the device is being used in its second mode, the rope 25 can be caused to pass through the upper force reacting pulley 39 in an instance in which the rope is being pulled through an underground conduit, or else the rope can be caused to pass over the upper as well as the lower force reacting pulley 36 when the rope is being pulled with respect to an overhead conduit system. It can thus be seen that my device can be effectively utilized in several different pulling modes.

As previously mentioned, I may additionally provide a third or middle force reacting device 40, which can be utilized in any of a selected number of locations along the principal frame members 12. To this end, I provide the previously mentioned holes 27 on the inside portion of each of the principal structural frame members 12, with such holes preferably being located in spaced relationship, with each hole being an equal number of inches away from each of the immediately adjacent holes in the same elongate structural member 12. Quite importantly, the spaced array of holes in one principal frame member 12 is in careful alignment with the array of holes in the other principal frame member 12, thereby assuring the adjustable height force reacting member 40 residing horizontally, and in an essentially parallel relation with, the upper and lower force reacting components in any given instance.

Each end of the adjustable height force reacting member 40 can be locked to the respective principal elongate frame member 12 at a selected location by the use on its underside of a pair of locking devices 64 of the type depicted in FIG. 6. An elongate pin 68 of the previously mentioned type is slidably mounted in housing member 70, as shown in FIG. 6, and a spring 69 biases the pin in a direction such that the lower or outer end of the pin protrudes into an appropriate hole in the adjacent structural member, which in this particular instance is the respective member 12. In this manner each end of the positionable force reacting member 40 is held in a desired relation to a selected, aligned pair of holes 27 as to bring about the desired relationship of the adjustable force reacting component 40 to the principal frame members 12. It is to be noted that by the use of the pulley 42, employed on a central portion of the force reacting member 40, a variety of different pull angles can be brought about by the operator, as will be discussed at greater length hereinafter.

Figure 13:
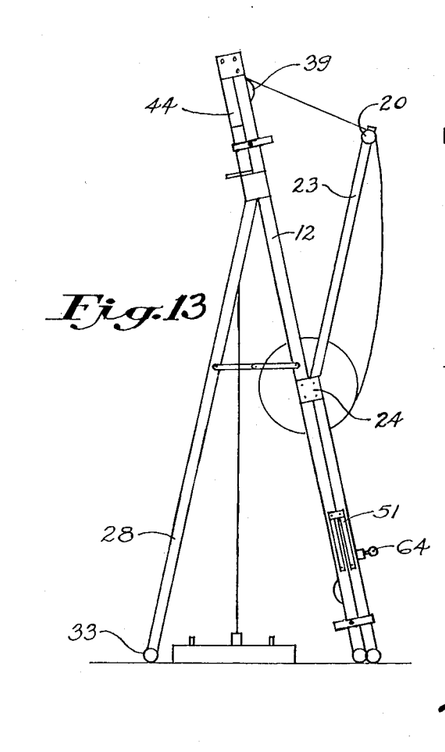
FIG. 13 is a side elevational view of my device used in a freestanding mode, in this instance being employed to pull a wire upwardly out of an underground conduit, with only the upper pulley needing to be used.
Figures 13A, 14:
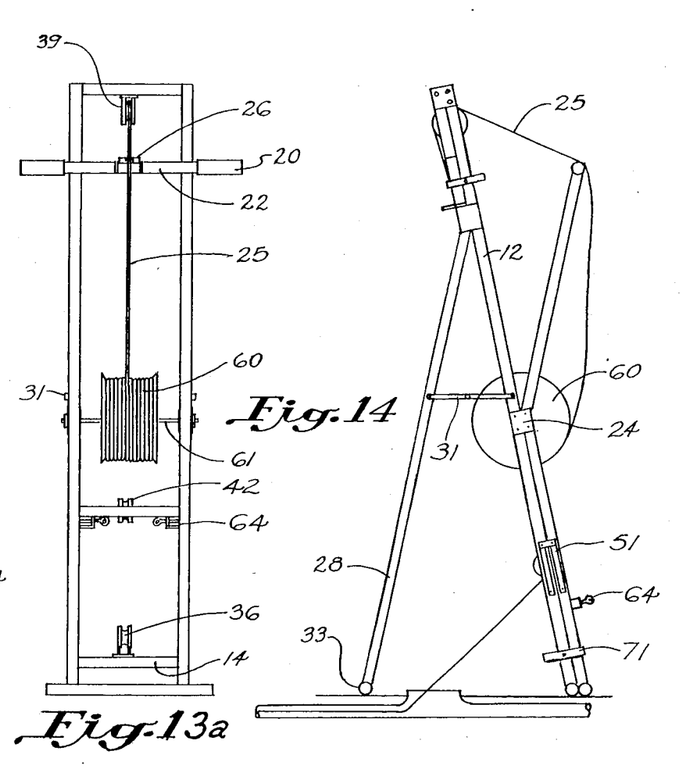
FIG. 13a is an edge view revealing some of the details associated with the spool upon which the pulling rope may be rewound.
FIG. 14 is my handle operated wire puller used in a freestanding mode, and utilizing the upper pulley and the center pulley in order to pull the underground wiring at approximately a 45° angle out of a conduit located below ground.

My novel hand operated wire puller preferably stores the rope 25 of nylon or "polypro" used for pulling the wires through a conduit by wrapping it around a drum 60 rotatably supported on a metal rod 61, visible in FIGS. 4 and 13a.

As should now be understood, when a cluster of wires is to be pulled through a conduit, a jetline string is placed at the end of the next conduit, and then the jetline is blown by the use of compressed air through the conduit to the next location at which an electrical device is to be installed, or conductors spliced together. At that new location, the string is used to pull the end of the rope through the conduit, so that it can be affixed to the end of the cluster of wires. At this point, the operators proceed to manipulate the handle 22 in the manner previously described, so as to cause the rope and therefore the cluster of wires to be pulled through the conduit.

As is obvious, when the rope is retrieved at the end of a pull, it is to be rewound on the drum 60, so that the rope will be ready, without entanglements, the next time it is to be used. Accordingly, I provide the drum support bar 61 that is preferably located in the center section of the principal frame members 12, removably supported by the aligned members 24. By the use of the drum support bar, the pull rope can be rolled up by hand onto the drum 60 and readied for moving to the next location of use, or else stored in a neat manner.

Figures 7, 8:
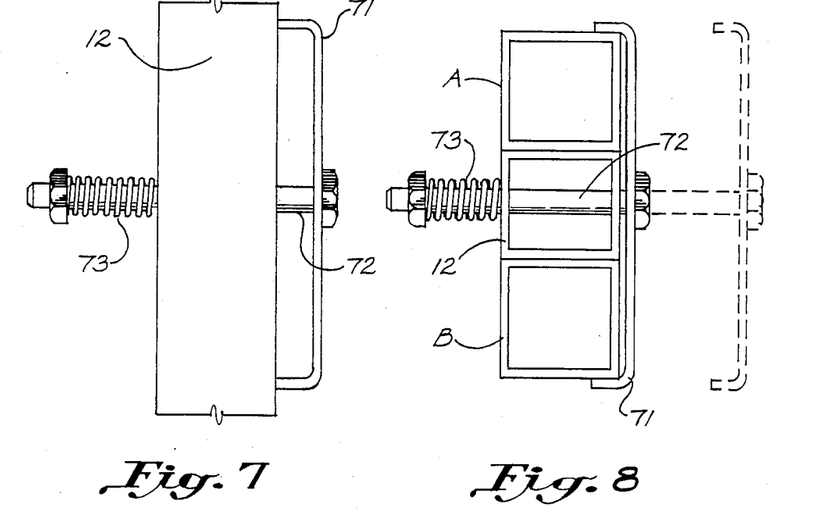
FIG. 7 is an enlarged view to show clamps in the nature of frame locks that are utilized to clamp the arms of the operating lever to the elongate structural members, with the locking means here being in the inoperative position.
FIG. 8 is another showing of the clamping means of FIG. 7, this time in the operative position.

In FIG. 7, I show a clamp 71, also known as a frame lock, of the type I prefer to use in order to hold the operating lever and the back brace against the frame members 12 during transit and storage. This device typically involves the midportion of the clamp 71 welded to a bolt 72, with the ends of the member 71 having a substantial bend therein. A compression spring 73 utilized on the bolt in order to force the clamp member 71 against the member 12, as well as against the members A and B located on each side of the member 12. The clamp or frame lock 71 is shown in the stored or inoperative position in FIG. 7, but in FIG. 8 it is revealed how this device, when turned 90°, can be utilized for locking movable portions of my device, such as the supporting legs, against the principal structural members 12.

Clamps of this type can be used at a plurality of locations on my wire pulling device, and in FIG. 4 for example, a clamp used above the pivot support locations 24 on each side of the device can be employed for holding the legs 44 and the arms 23 to the frame members 12 during storage or transport. Somewhat similarly, another pair of clamps or frame locks can be used below the pivot support locations 24, with each clamp serving to hold an elongate member 30 and a front leg portion 55 against the frame member 12.

Figure 9:
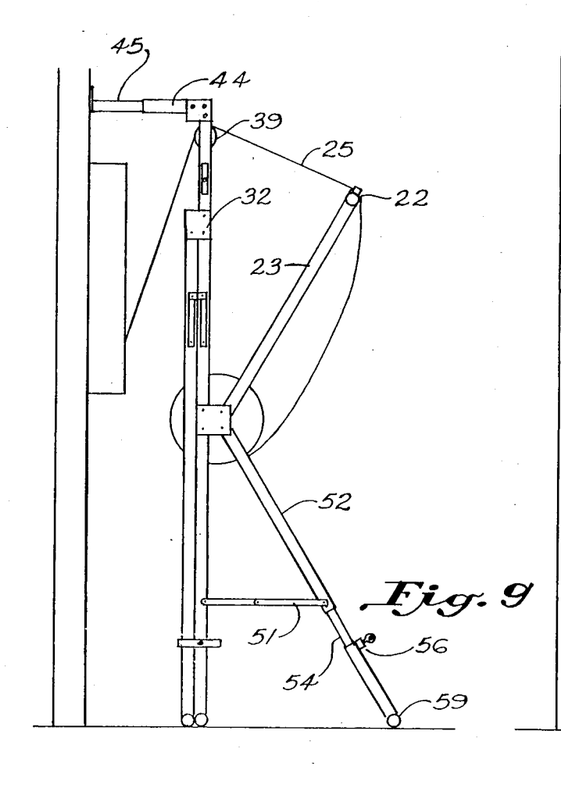
FIG. 9 is a side elevational view of my handle operated wire puller used against a wall and employed with a suitable rope for pulling a wire upward through an electrical box.

In order to illustrate the versatility of my device, attention is called to the series of figures beginning with FIG. 9. In this figure it will be seen that the short legs 44 have been moved to the extended position, in which they rest against a wall. To prevent a condition in which my wire puller might fall away from the wall during certain operations, I extend the front auxiliary support component 50 so as to create a stable condition for the elongate frame 10. A lower locking brace 51 is utilized to prevent an undesired folding of the component 50 to the flattened condition.

In an operation of the type depicted in FIG. 9, when the rope is being used to pull a wire upward through a panel, only a single pulley is needed, this being pulley 39, mounted on the upper cross member 18 of my device. Thus, when the handle of the operating lever is pulled down, the cam cleat 26 causes tension in the rope 25, such that continued downward pulling of the operating lever causes the rope extending through the handle 22 to move upwardly, this in turn bringing about the desired upward movement of the wire in its conduit. The down and back movements of the operating lever 20 are continued until the end of the wire emerges through the panel box or breaker cabinet.

Figure 10:
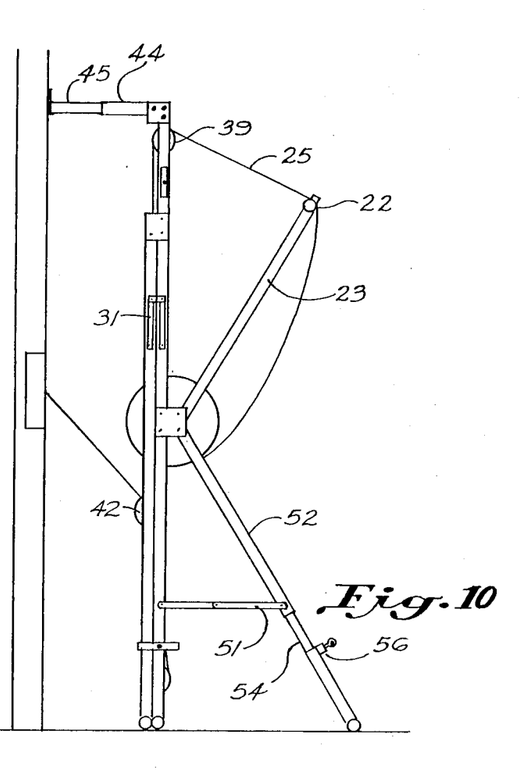
FIG. 10 is an example of an instance in which the rope is pulled outwardly and downwardly, with this embodiment of my device being used with an upper and lower pulley, and with an adjustable height middle pulley also being utilized in order to bring about a desired rope pull angle.

In FIG. 10 it will be noted that the pull is downwardly and outwardly from the flush mounted electrical outlet box. Because of the pull angle that is involved, the rope extends through the upper pulley 39, thence downwardly to extend down through the lower pulley 36, after which it is desirable for the rope to pass through the middle pulley 42 in order to achieve the desired pull angle. It will be recalled that the pulley 42 is mounted on the adjustable height force reacting device 40, so in order that the pull angle will be satisfactory, the operator positions the device 40 in the optimum position.

It is to be noted that the operator can sometimes do without use of bottom pulley 36 during a downward pull, as long as the middle pulley lines up with conduit and does not cause the rope to rub against the edge of the pull box or splice box.

Figure 11:
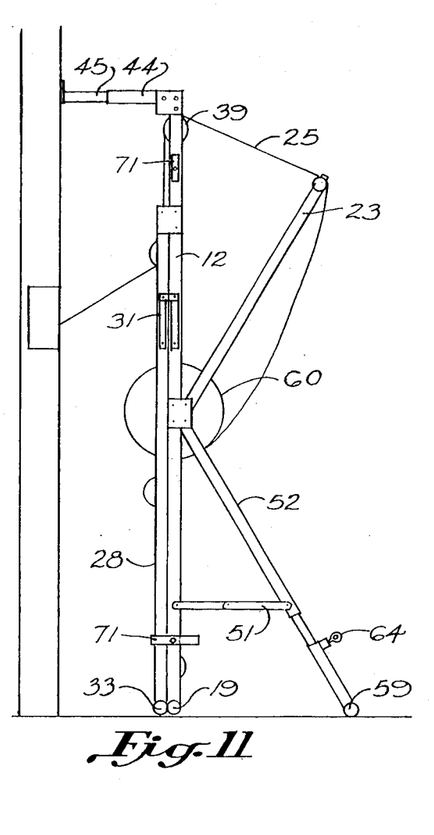
FIG. 11 is another instance of my wire puller being utilized against a wall, with the rope being used with the upper pulley and the adjustable height middle pulley, with latter pulley being placed so as to provide a pull that is outwardly and somewhat upwardly in this instance.

Turning to FIG. 11 it will be seen that my device is leaning against a wall, with the lower portions 55 of the extensible legs 52 of the auxiliary support device 50 being extended to give stability to the structure. Because in this instance the operator is endeavoring to pull the rope outwardly from the electrical box, it is desirable to utilize the adjustable height force reacting device 40 and its pulley 42 in a comparatively high location on the frame members 12 in order that a desired pull angle can be achieved. As previously explained, the adjustable height device 40 can be installed at any of a number of desired operating positions upon the elongate structural members 12, utilizing a selected aligned pair of holes 27. In FIG. 11, after the device 40 has been located in a position slightly higher than the pull box through which the wire is to be pulled, the rope 25 is then threaded through the pulley 42 located on the device 40, with the rope then passing through and around pulley 39, that is of course supported from the upper cross member 18.

As can therefore be seen from FIG. 11, the rope 25 extends from the clamping device 26 on the operating lever, up through the upper pulley 39, thence downward through the third or center pulley 42, and into the pull box. Should the operator find that the angle of pull is not optimum, he can easily reposition the adjustable height force reacting device 40 until he achieves the desired pull angle.

Figure 12:
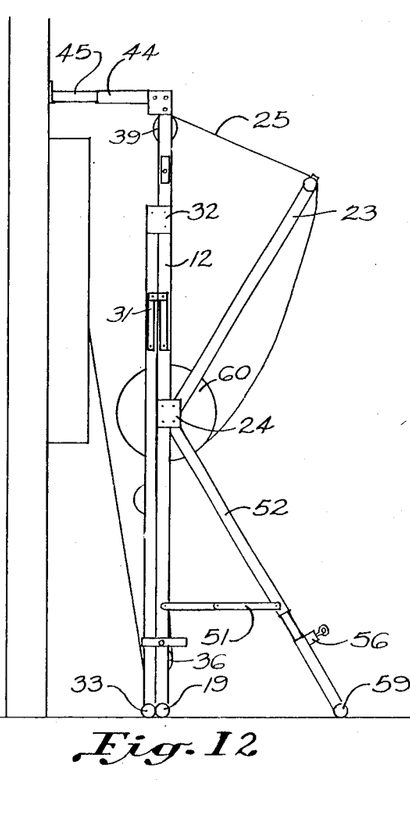
FIG. 12 is an embodiment in which the wire puller is being used to pull the rope downwardly, out of an electrical box, with the rope in this instance passing over the upper pulley and the lower pulley of the device.

In FIG. 12 it will be noted that the operator is endeavoring to pull a rope, with conductors attached, downward through a pull box by the use of my wire puller utilized in the mode in which it leans against a wall. Because of the desire to bring about a downward pull, the rope, after passing from the pull box over the lower pulley 36, then extends upwardly to the pulley 39 used on the upper force reacting component 18. From the pull angle involved in this instance, only pulley 39 at the top and pulley 36 at the bottom need be utilized.

In FIG. 13 I have shown my wire pulling device in its freestanding mode, in which the elongate members 30 are moved to their wide stance position, with the upper locking brace 31 being locked to hold the legs 30 in the extended position. In this particular instance, the operators are endeavoring to pull an electric wire out of an underground conduit, up through a light pole base. In this type of pull, only a single pulley is needed, this being the upper pulley 39, which of course is supported from the upper cross member 18. Continued movements of the operating lever 20 away from and then back toward the elongate structural members 12 will cause, because of the functioning of the rope clamping means 26, the continued withdrawal of the rope through the conduit until such time as the wire emerges to an extent such that it can be directly grasped.

FIG. 13a is a figure utilized so that the relationship of the drum 60 to the remainder of the device can be clearly seen. The drum 60 is of course freely supported on the rod 61.

FIG. 14 is a view illustrating how my device used in its freestanding mode may be utilized for making an upward pull at a decided angle to the vertical, such as a pull angle of approximately 45°. In this particular instance, my device is in place above an underground duct that had been installed in a floor slab. A vertically upward pull would not be appropriate in this instance inasmuch as a high degree of friction would ensue as a result of the rope rubbing against the duct inlet. Accordingly, in this instance I prefer to use both the upper pulley 39 as well as the center pulley 42, for the rope leaving the center pulley will be disposed at an appropriate angle, such that all unnecessary friction is avoided.

As will now be clearly understood, in virtually all of these maneuvers, my wire pulling device can either be used in the mode in which it leans against a wall, or in the freestanding mode. Advantageously, the plurality of auxiliary support frames, pivotally attached at appropriate locations to the elongate structural members 12, enable my lightweight device to be maintained in a stable configuration, irrespective of the mode in which it is used.

When my device s being used in order to pull wires from an underground conduit in a parking lot, for example, where there is no wall for my device to lean against, the freestanding mode is desirable to use. On the other hand, when a cluster of wires is to be pulled through a pull box located in a wall, it is usually not possible to get the device used in its freestanding mode close enough to the pull box, and the use of the front auxiliary frame 50 in conjunction with the adjustable length upper legs 44 placed against the wall becomes desirable.

I claim:

1. A lightweight, portable device for pulling a plurality of relatively small wires through a conduit by the use of a rope attached thereto, without using a winch or necessitating the use of external power, said device comprising an elongate frame particularly adapted for use in a substantially upright position and having lower and upper ends, the lower end of said frame having floor engaging portions, with a pivotally mounted operating lever operatively located adjacent a middle portion of said frame, at least one force-reacting component on said frame over which the rope used with the device passes, for changing the direction of pull of the rope, rope clamping means on said operating lever for releasably grasping successive portions of the rope during the pulling process, said operating lever being movable by one or more operators about its pivot point from a position in which said operating lever resides in a plane substantially parallel to and closely adjacent the plane of said elongate frame, to a position in which said operating lever resides at approximately right angles to the plane of said frame, each such movement of said operating lever serving to cause several feet of rope to move with respect to said force-reacting component that serves to change the pull direction of the rope, and thus to cause the plurality of wires attached to the rope to move along the conduit for a like distance.

2. The lightweight, portable device as recited in claim 1 in which said device is usable in two operative modes, with the first being a free standing mode, and the second mode involving the device being caused to lean against a firm vertical surface for lateral support.

3. The lightweight, portable device as recited in claim 2 in which said device, when employed in its first, free-standing mode, is utilized in conjunction with an auxiliary frame pivotally attached to the rear side of said elongate frame, said auxiliary frame being extendable to provide stability for said elongate frame when utilized in its free standing mode, said auxiliary frame being foldable into a plane substantially parallel to the plane of said elongate frame when not in use.

4. The lightweight, portable device as recited in claim 2 in which said device, when used in said second mode, being used in conjunction with a auxiliary support component pivotally mounted upon the lower front portion of said elongate frame, said auxiliary support component normally being folded into a plane substantially parallel to the plane of said elongate frame, and being extended into an operative position at such time as said device is to be used in said second mode.

5. The lightweight, portable device as recited in claim 4 in which a pair of short legs are pivotally mounted on the upper rear side of said elongate frame, with said short legs normally being folded into a plane substantially parallel to the plane of said elongate frame, but being extended into a substantially right angle relationship with said elongate frame at such time as said device is to be used in its second mode.

6. The lightweight, portable device as recited in claim 1 in which a drum is rotatably supported on a mid portion of said elongate frame, said drum serving to dispense rope at the time the rope is to be pulled through a conduit for drawing wires through the conduit, said drum being turned to rewind the rope at such time as the wires have been drawn completely through the conduit.

7. The lightweight, portable device as recited in claim 1 in which an adjustable height force reacting component is provided on said elongate frame, which can be secured at any one of a number of preselected positions on said elongate frame.

8. A lightweight, portable device for pulling a plurality of relatively small wires through a conduit by the use of a rope attached thereto, without using a winch or necessitating the use of external power, said device comprising an elongate frame particularly adapted for use in a substantially upright position and having lower and upper ends, said frame being principally constituted by a pair of elongate structural members rigidly held in a spaced, parallel relationship, the lower end of said frame having floor engaging portions, with a pivotally mounted operating lever operatively supported at aligned pivot points on said elongate structural members adjacent a mid portion of said frame, at least one force-reacting component on said frame over which the rope used with the device passes, for changing the direction of pull of the rope, rope clamping means on said operating lever for releasably grasping successive portions of the rope during the pulling process, said operating lever being movable by one or more operators about its pivot points from a position in which said operating lever resides in a plane substantially parallel to and closely adjacent the plane of said elongate frame, to a position in which said operating lever resides at approximately right angles to the plane of said frame, each such movement of said operating lever serving to cause several feet of rope to move with respect to said force-reacting component that serves to change the pull direction of the rope, and thus to cause the plurality of wires attached to the rope to move along the conduit for a like distance.

9. The lightweight, portable device as recited in claim 8 in which said device is usable in two operative modes, with the first being a free standing mode, and the second mode involving the device being caused to lean against a firm vertical surface for lateral support.

10. The lightweight, portable device as recited in claim 9 in which said device, when employed in its first, free-standing mode, is utilized in conjunction with an auxiliary frame pivotally attached to the rear side of said elongate structural members, said auxiliary frame being extendable to provide stability for said portable device when utilized in its free standing mode, said auxiliary frame being foldable into a plane substantially parallel to the plane of said elongate structural members when not in use.

11. The lightweight, portable device as recited in claim 9 in which said device, when used in said second mode, being used in conjunction with a auxiliary support component pivotally mounted upon the lower front portion of said elongate structural members, said auxiliary support component normally being folded into a plane substantially parallel to the plane of said elongate structural members, and being extended into an operative position at such time as said device is to be used in said second mode.

12. The lightweight, portable device as recited in claim 11 in which a pair of short legs are pivotally mounted on the upper rear side of said elongate structural members, with said short legs normally being folded into a plane substantially parallel to the plane of said elongate structural members, but being extended into substantially right angle relationship with said elongate structural members at such time as said device is used in its second operative mode.

13. The lightweight, portable device as recited in claim 8 in which a drum is rotatably supported in a mid portion of said elongate structural members, said drum serving to dispense rope at the time the rope is to be pulled through a conduit for drawing wires through the conduit, said drum being turned to rewind the rope at such time as the wires have been drawn completely through the conduit.

14. The lightweight, portable device as recited in claim 8 in which an adjustable height force reacting component is provided on said elongate frame, which can be positioned at any one of a number of preselected positions upon said elongate structural members.

15. The lightweight, portable device as recited in claim 8 in which an upper force reacting component in the form of a pulley is utilized on said elongate frame, over which the rope operatively passes at the time an upward pull is to be effected.

16. The lightweight, portable device as recited in claim 8 in which an upper force reacting component as well as a lower force reacting component are used on said elongate frame, on each of which a pulley is used, over each of which pulleys the rope may be caused to operatively pass when a downward pull is to be accomplished.

17. The lightweight, portable device as recited in claim 16 in which an additional, adjustable height force reacting component is provided on said elongate frame, which can be positioned at any one of a number of preselected positions upon said elongate structural members, in order that a pull in a direction selected by the operator may be accomplished.

18. A lightweight, portable device for pulling a plurality of relatively small wires through a conduit by the use of a rope attached thereto, without using a winch or necessitating the use of external power, said device comprising an elongate frame particularly adapted for use in a substantially upright position and having lower and upper ends, said frame being principally constituted by a pair of elongate structural members rigidly held in a spaced, parallel relationship, the lower end of said frame having floor engaging portions, with a pivotally mounted operating lever operatively supported at aligned pivot points located approximately at the midpoint of said elongate structural members, at least one force-reacting component mounted at a fixed location on said frame, over which the rope used with the device passes, for changing the direction of pull of the rope, at least one force-reacting component positionable at any of a number of selected locations on said frame, such that a pull at a selected angle can be accomplished, rope clamping means on said operating lever for releasably grasping successive portions of the rope during the pulling process, said operating lever being movable by one or more operators about its pivot points from a position in which said operating lever resides in a plane substantially parallel to and closely adjacent the plane of said elongate frame, to a position in which said operating lever resides at approximately right angles to the plane of said frame, each such movement of said operating lever serving to cause several feet of rope to move with respect to each of said force-reacting components that serves to change the pull direction of the rope, and thus to cause the plurality of wires attached to the rope to move along the conduit for a like distance.

19. The lightweight, portable device as recited in claim 18 in which a plurality of holes are defined at spaced intervals along the midportions of said elongate structural members, and means for attaching said positionable force-reacting component to a pair of such holes at a selected location on said elongate structural members, so that a pull with the rope disposed at a selected angle to the vertical may be achieved.

20. The lightweight, portable device as recited in claim 18 in which a plurality of auxiliary support frames are pivotally attached at appropriate locations to said elongate structural members, so that said lightweight device can be maintained in a stable configuration during the time a rope is being used therewith in order to pull wires through an underground or an overhead conduit.

* * * * *